No. 738,597. PATENTED SEPT. 8, 1903.
P. BERGLUND.
DITCHING MACHINE.
APPLICATION FILED MAY 25, 1903.
NO MODEL. 2 SHEETS—SHEET 1.
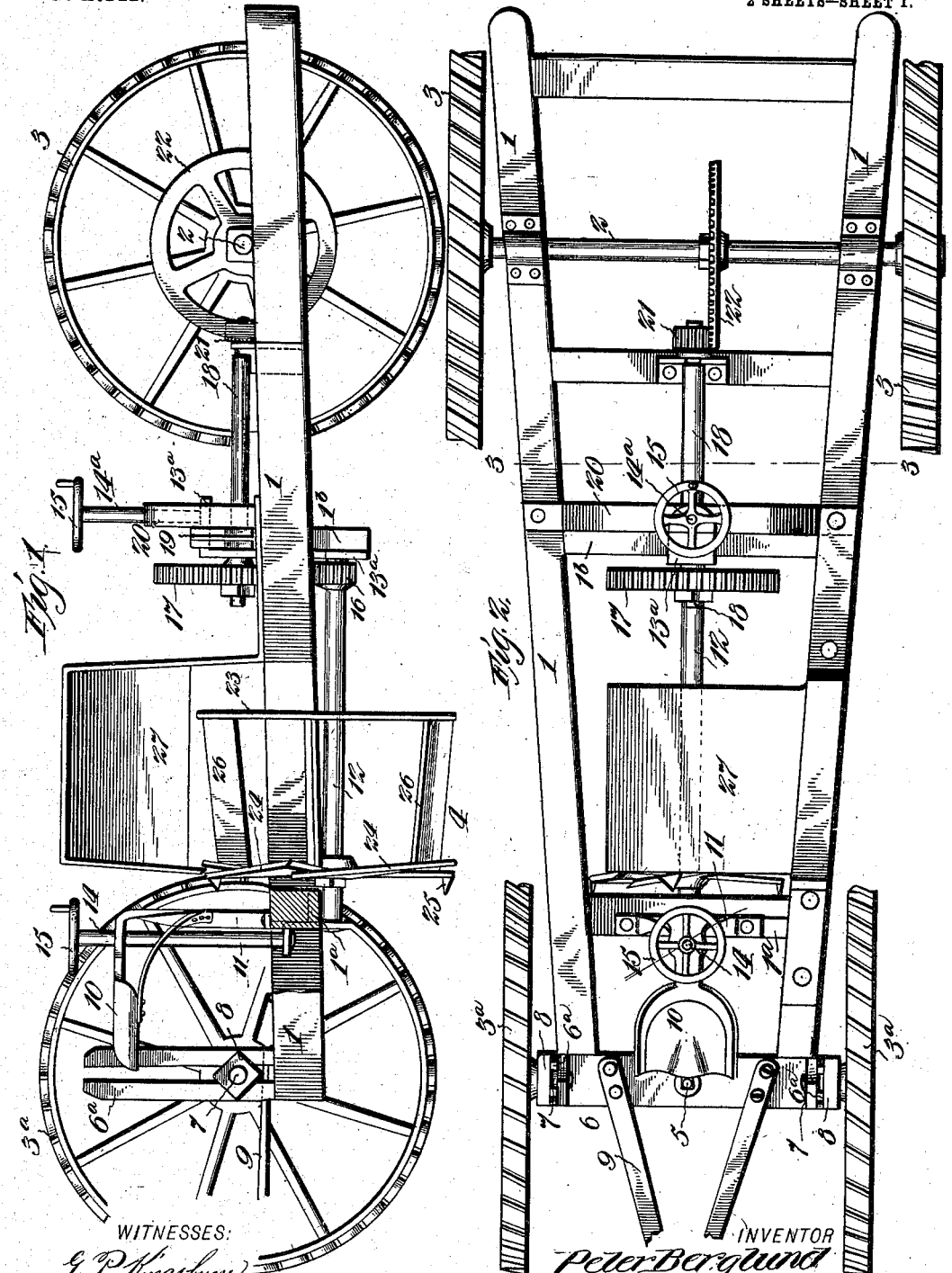
WITNESSES:
G. P. Kingsbury
Amos W. Hart
INVENTOR
Peter Berglund
BY Munn & Co.
ATTORNEYS.

No. 738,597. PATENTED SEPT. 8, 1903.
P. BERGLUND.
DITCHING MACHINE.
APPLICATION FILED MAY 25, 1903.
NO MODEL.
2 SHEETS—SHEET 2.
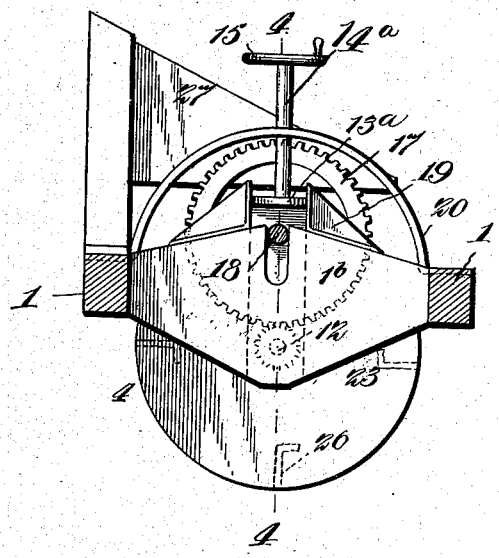
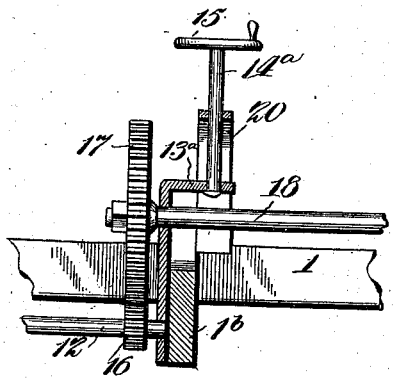
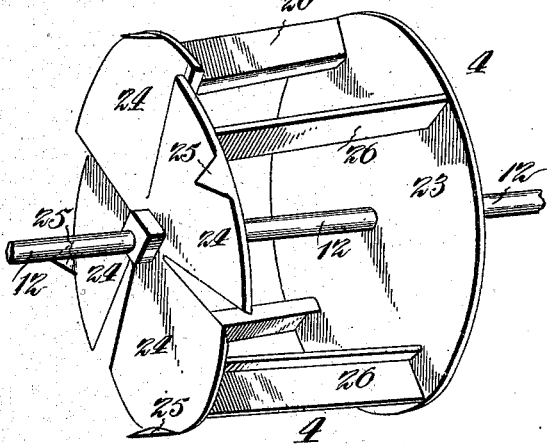
WITNESSES:
INVENTOR
Peter Berglund,
BY
ATTORNEYS.

No. 738,597.

Patented September 8, 1903.

UNITED STATES PATENT OFFICE.

PETER BERGLUND, OF NEWMAN GROVE, NEBRASKA.

DITCHING-MACHINE.

SPECIFICATION forming part of Letters Patent No. 738,597, dated September 8, 1903.

Application filed May 25, 1903. Serial No. 158,664. (No model.)

*To all whom it may concern:*

Be it known that I, PETER BERGLUND, a citizen of the United States, residing at Newman Grove, in the county of Madison and State of Nebraska, have made certain new and useful Improvements in Ditching-Machines, of which the following is a specification.

My invention is an improvement in that class of ditching-machines in which a rotating borer or auger is employed.

One feature of my invention is the provision for convenient vertical adjustment of the auger or borer whereby it is adapted for boring ditches of varying depths.

Another important feature is the improved construction of the auger or borer itself, whereby it is adapted for both cutting and slicing the earth as the machine advances and also for throwing out the soil thereby loosened.

The invention further includes other features of construction, arrangement, and operation of parts, as hereinafter described.

In the accompanying drawings, Figure 1 is mainly a side view, part being in section, of my improved machine. Fig. 2 is a plan view of the same. Fig. 3 is a transverse vertical section on the line 3 3 of Fig. 2. Fig. 4 is a vertical section on the line 4 4 of Fig. 3. Fig. 5 is a perspective view of the auger or borer.

The numeral 1 indicates the frame of the machine. The same is formed of longitudinal bars, which converge slightly toward the front end, and a series of cross-bars connecting the said side bars. The rear end of the frame is supported from the axle 2 of transporting-wheels 3, which are provided with diagonal mud-claws for adapting them to take a firm hold on the soil. The borer 4 (see Figs. 1 and 5) is driven from the rear shaft 2 through the medium of gearing which will be presently described. The front end of the frame 1 is pivotally connected at 5 (see Fig. 2) with an axle 6, which is formed of steel or iron and whose ends $6^a$ are bent upward at a right angle and provided with vertical slots, as shown in Figs. 1 and 2. The front wheels $3^a$ are journaled upon stud-axles 7, which are screw-threaded and secured to the upright portion $6^a$ of the axle 6 by means of nuts 8, arranged on the outer and inner sides of the forks $6^a$. It is apparent that by due adjustment of the nuts 8 the said axles may be adjusted higher or lower in the slots of the fork $6^a$, so as to raise or lower the front end of the frame 1 as conditions may require. The axle 6 is provided with hounds 9, to which a tongue may be connected in any suitable manner.

The driver's seat 10 is supported slightly in rear of the front axle by means of a bracket 11, secured upon the front cross-bar $1^a$.

The auger or borer 4 is keyed upon a horizontal shaft 12, which is arranged centrally and longitudinally of the frame 1 and beneath the same, as shown in Fig. 1. The front end of said shaft 12 is journaled in a plate 13, which is arranged in a vertical slot formed in the front side of a cross-bar $1^a$ and connected with a vertical rotatable screw-shaft 14, having at the top a hand-wheel 15. It is apparent that by rotation of this shaft 14 the angle-plate 13 may be adjusted higher or lower, whereby the auger 4 will also be similarly adjusted relative to the frame 1, so as to cut ditches of varying depths. The rear end of the auger-shaft 12 is journaled in a plate $13^a$, whose upper end is connected with a vertical threaded shaft $14^a$, having at the top a hand-wheel 15, as in the case of the front shaft 14, before described. The auger-shaft 12 is provided at its rear end with a pinion 16, which meshes with a large spur-gear 17. The latter is keyed upon a horizontal shaft 18, arranged above the cross-bar $1^b$, (see Fig. 3,) in a slot of which the plate $13^a$ is adapted to slide vertically. The plate $13^a$ is thus guided vertically, and as other means for holding it in vertical position while being adjusted higher or lower I employ web-guides 19, (see Fig. 3,) which are secured upon the upper inclined portions of the cross-bar $1^b$. The vertical screw-shaft $14^a$ hangs in a curved yoke or bracket 20, which is suitably secured to and rests upon the side bars 1 of the frame. The shaft 18 passes through and is journaled in the angular plate $13^a$, so that by rotating the shaft $14^a$ the adjacent ends of the shafts 12 and 18 may be raised and lowered together, while the mesh of the pinion 16 and gear 17 is maintained. It is apparent that such adjustment may be effected at the same time that the front adjustment is effected by the front screw-shaft 14. In brief, the auger or borer 4 may be adjusted bodily, vertically, or its angle to the plane in which the machine advances may be changed slightly, as conditions may require. The rear end of the shaft 18 is operatively connected with the rear axle 2 by means of its pinion 21, which meshes with a large gear 22, keyed upon the said axle.

The auger or borer 4 is constructed as follows: The rear end of the same is constructed of a disk 23, and the front portion consists of a disk which is divided radially into four sector-shaped portions 24, which are turned or twisted slightly, so as to form a series of spiral cutting-blades. It will be understood that these blades are sharpened at one edge, as indicated in Fig. 5. Each of the blades 24 is further provided with a cutter 25, which is V-shaped and projects forward at a right angle to the shaft 12. The two heads 23 24 of the auger are connected by bars or plates 26, which are right angular in cross-section. These parts 26 are rigidly attached to the respective heads 23 24, and by their form and arrangement are adapted to serve as diggers and shovels and to throw out of the ditch the soil cut, sliced, and loosened by the several cutters 24. In further explanation I will state that as the machine advances, the rear wheels 3 being rotated, the auger 4 is driven through the medium of the gearing before described, and the horizontal cutters 25 and spiral cutters 24 cut and slice the earth, the portions so loosened passing rearward through the spaces between the cutters 24 and falling into the space between the latter and the rear disk 23, where it is taken up by the shovels 26 and thrown laterally out of the ditch.

It will be seen that the rotation of the auger 4 is quite rapid in view of the employment of the differential gearing shown and described. As an aid in guiding laterally the earth thrown up by the shovels 26, I employ a hood 27, which is curved laterally over the auger 4 and is open on the side where the soil is lelivered.

As thus constructed the machine is light, strong, and operates effectively for cutting ditches of varying depths in low and soft soils.

Having thus described my invention, what I claim as new, and desire to secure by Letters Patent, is—

1. The improved ditching-machine, comprising a suitable frame, axles and wheels supporting the same, the front axles being adjustably connected with the frame whereby the latter may be raised and lowered at its front end, a rotary auger arranged horizontally and fixed upon a shaft arranged longitudinally of the frame beneath the same, means for adjusting the auger higher or lower, and gearing operatively connecting it with the rear driving axle and wheel, substantially as shown and described.

2. In a ditching-machine of the class described, the combination, with the frame, a rotary auger, and means for operatively connecting it with the rear driving axles and wheels, of means for adjusting the auger-shaft vertically, the same consisting of a screw-shaft journaled in vertical position, and a plate connecting it with the auger-shaft and sliding in guides, substantially as shown and described.

3. In a ditching-machine, the combination, with a suitable frame, and wheels and axles supporting the same, of a rotary borer and a shaft whereon the same is mounted, a power-transmitting shaft geared with the auger-shaft, and a driving-gear fixed on the rear axle and meshing with a pinion fixed on the driving-shaft, substantially as described.

4. In a ditching-machine, the combination, with a suitable frame, and wheels and axles supporting the same, and a rotary auger having a shaft arranged longitudinally beneath the frame, of gearing for driving the said auger, the same consisting of a driving-shaft and meshing gears arranged as described whereby the auger-shaft is operatively connected with the rear axle, and means for adjusting the auger-shaft and drive-shaft together with their meshing gears in a vertical plane, the same comprising a plate adapted to slide in suitable vertical guides, and a screw-shaft connecting with said plate and working in a bracket or yoke, substantially as shown and described.

5. In a ditching-machine, the combination, with the rotary auger and its longitudinal shaft, and the rear axle having running wheels keyed thereon, of the driving-shaft which is geared with said axle and also with the auger-shaft, means for adjusting the two shafts at their adjacent ends, which consist of a vertically-slidable plate and a screw-shaft working in a fixed yoke, and a transverse bar connecting the sides of the frame and having vertical guide-slots for the aforesaid plate, substantially as shown and described.

6. In a ditching-machine, the combination, with a frame and supporting wheels and axles, of a rotary auger, and a shaft therefor arranged longitudinally of the frame and beneath the same, the said auger comprising a front cutter and shovels adapted for throwing the soil laterally, substantially as described.

7. The combination, with a suitable wheeled frame, of the rotary auger and means for driving the same, the said auger consisting of a vertical rear disk, a front portion also arranged vertically and comprising a series of radial cutters arranged spirally, and a series of bars connecting the front and rear portions of the auger and serving as shovels for throwing the earth laterally, substantially as shown and described.

8. In a ditching-machine, the combination, with a suitable wheeled frame, and mechanism connected with the rear axle, of the rotary auger arranged with its axis horizontal, and comprising a rear disk, a front cutter and slicer consisting of a series of sector-shaped blades having forwardly-projecting horizontal cutters, and a series of bars connecting the front and rear portions of the auger, and constructed angular in cross-section, to adapt them to serve as shovels for throwing out of the ditch the soil loosened by the cutter, substantially as shown and described.

9. In a ditching-machine, the combination, with a suitable wheeled frame, of a rotary auger arranged in the same, and means for driving the auger, of a hood attached to the frame and extending over the auger and having one side open, as and for the purpose specified.

PETER BERGLUND.

Witnesses:
PETER S. DAHLSTRÖN,
FRANK JOHNSON.